(12) United States Patent
Zhang et al.

(10) Patent No.: US 11,193,222 B2
(45) Date of Patent: Dec. 7, 2021

(54) SELF-WRAPPING, BRAIDED TEXTILE SLEEVE WITH SELF-SUSTAINING EXPANDED AND CONTRACTED STATES AND METHOD OF CONSTRUCTION THEREOF

(71) Applicant: FEDERAL-MOGUL POWERTRAIN LLC, Southfield, MI (US)

(72) Inventors: Zhong Huai Zhang, Pottstown, PA (US); Jimmy E. Teal, Mohnton, PA (US); Tianqi Gao, Exton, PA (US); Leigh Krauser, Pomeroy, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 115 days.

(21) Appl. No.: 16/729,927

(22) Filed: Dec. 30, 2019

(65) Prior Publication Data
US 2020/0131681 A1 Apr. 30, 2020

Related U.S. Application Data

(62) Division of application No. 15/337,472, filed on Oct. 28, 2016, now Pat. No. 10,519,578.
(Continued)

(51) Int. Cl.
*D04C 1/02* (2006.01)
*D06C 7/02* (2006.01)
(Continued)

(52) U.S. Cl.
CPC .............. *D04C 1/02* (2013.01); *D03D 1/0041* (2013.01); *D03D 3/08* (2013.01); *D04C 1/06* (2013.01);
(Continued)

(58) Field of Classification Search
CPC .............. D04C 1/02; D04C 1/06; D06C 7/02
See application file for complete search history.

(56) References Cited

U.S. PATENT DOCUMENTS 5,186,992 A * 2/1993 Kite, III ................... D04C 1/02
428/198
5,866,216 A * 2/1999 Flasher ................... H02G 15/18
428/36.1
(Continued)

FOREIGN PATENT DOCUMENTS

JP S4820532 U 3/1973
JP 2017533353 A 11/2017
WO 2014123869 A 8/2014

*Primary Examiner* — Shaun R Hurley
(74) *Attorney, Agent, or Firm* — Robert L. Stearns; Dickinson Wright, PLLC

(57) ABSTRACT

A self-wrapping protective textile sleeve and method of construction is provided. The sleeve includes a braided, tubular wall having opposite free edges extending lengthwise between opposite ends. The wall has a first state with a decreased length, increased cross-sectional area and a second state with an increased length, decreased cross-sectional area, as viewed in cross-section taken generally transversely to a central longitudinal axis. The wall further includes braided, heat-set yarns imparting a bias on the wall, wherein the bias causes the wall to self-wrap into a tubular configuration and to remain substantially in the first and second states absent some externally applied force.

16 Claims, 11 Drawing Sheets

Related U.S. Application Data

(60) Provisional application No. 62/248,178, filed on Oct. 29, 2015.

(51) Int. Cl.
 D03D 3/08 (2006.01)
 D03D 1/00 (2006.01)
 D04C 1/06 (2006.01)

(52) U.S. Cl.
 CPC .......... D06C 7/02 (2013.01); *D10B 2401/046* (2013.01); *D10B 2403/0311* (2013.01); *D10B 2505/12* (2013.01)

(56) References Cited

U.S. PATENT DOCUMENTS

| | | | |
|---|---|---|---|
| 8,910,554 B2* | 12/2014 | Kinugasa | D04C 1/06 87/9 |
| 10,167,581 B2* | 1/2019 | Fathallah | B29C 35/02 |
| 10,202,714 B2* | 2/2019 | Fathallah | B29B 11/04 |
| 10,443,166 B2* | 10/2019 | Krauser | D04C 1/06 |
| 10,519,578 B2* | 12/2019 | Zhang | D06C 7/02 |
| 2003/0135265 A1* | 7/2003 | Stinson | D04C 1/06 623/1.16 |
| 2004/0109965 A1 | 6/2004 | Klinklin | |
| 2005/0238832 A1 | 10/2005 | Kostamo | |
| 2008/0228028 A1* | 9/2008 | Carlson | A61F 2/07 600/36 |
| 2010/0030321 A1* | 2/2010 | Mach | D04C 1/06 623/1.18 |
| 2014/0220276 A1* | 8/2014 | Gao | D04C 1/06 428/36.1 |
| 2016/0122915 A1 | 5/2016 | Fathallah et al. | |
| 2016/0122916 A1* | 5/2016 | Fathallah | B29C 35/02 87/9 |
| 2017/0121868 A1* | 5/2017 | Zhang | D03D 3/02 |
| 2017/0121871 A1* | 5/2017 | Krauser | D04C 1/02 |
| 2017/0137978 A1* | 5/2017 | Gao | D04C 1/08 |
| 2017/0207005 A1* | 7/2017 | Khosroshahi | D03D 1/0041 |
| 2018/0057982 A1* | 3/2018 | Qiu | D04C 1/02 |

* cited by examiner

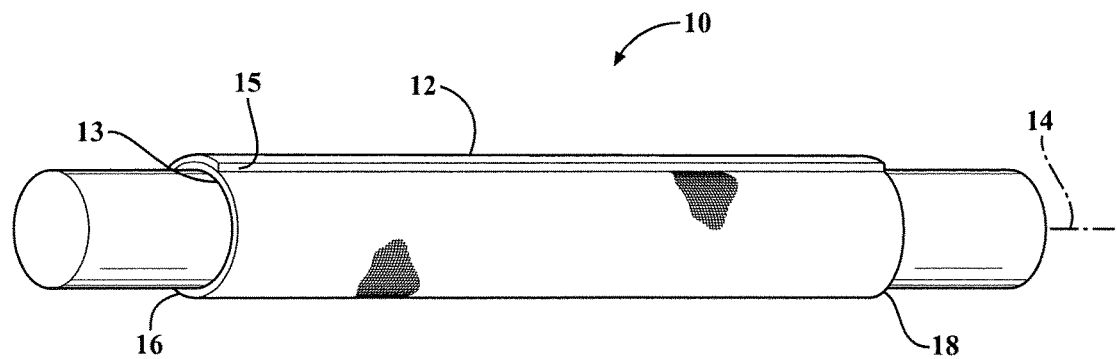
FIG. 1
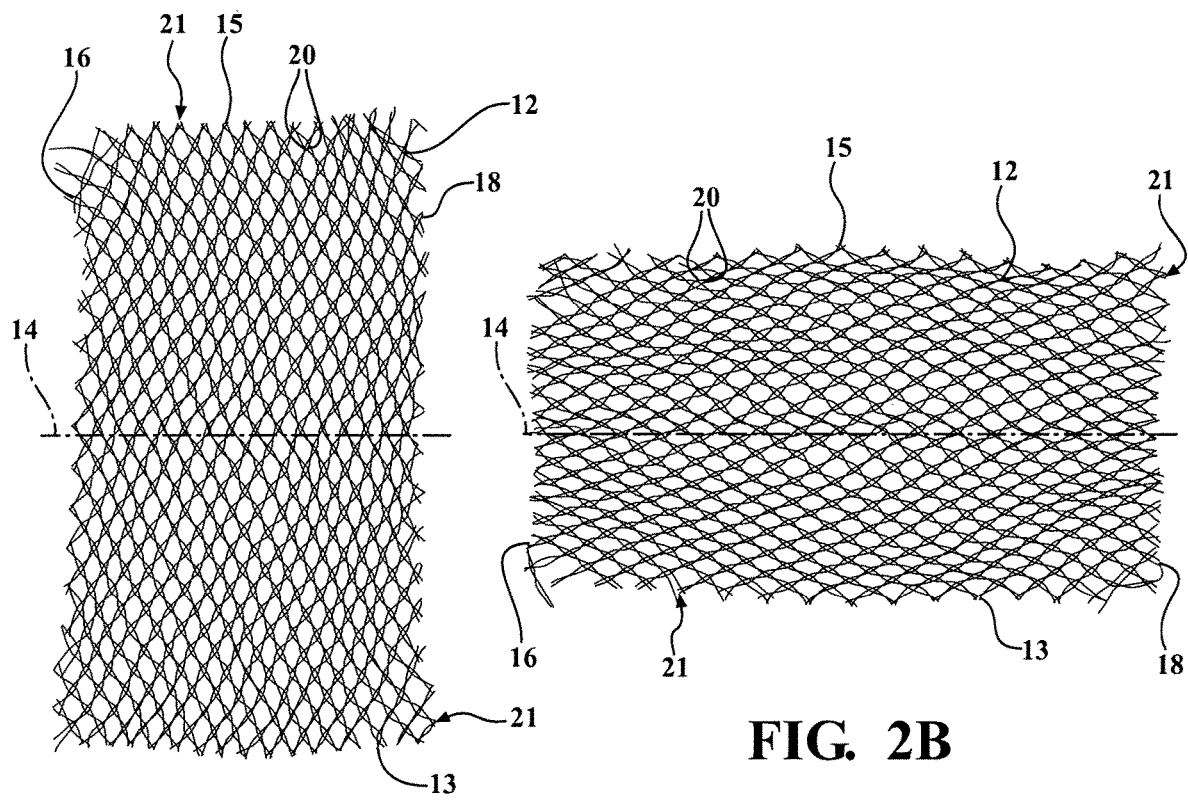
FIG. 2A
FIG. 2B

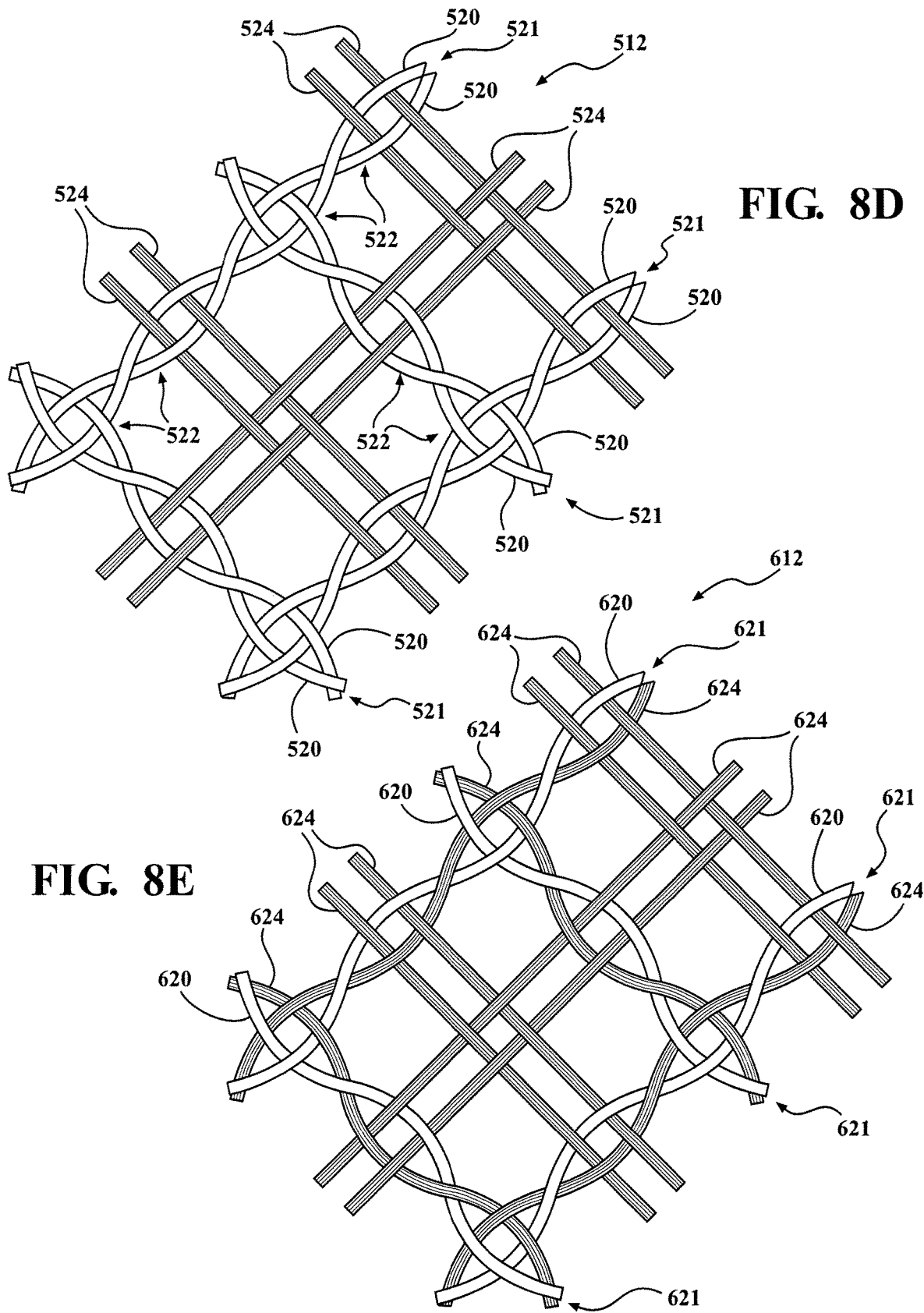

SELF-WRAPPING, BRAIDED TEXTILE SLEEVE WITH SELF-SUSTAINING EXPANDED AND CONTRACTED STATES AND METHOD OF CONSTRUCTION THEREOF

CROSS-REFERENCE TO RELATED APPLICATION

This U.S. Divisional application claims the benefit of U.S. Utility application Ser. No. 15/337,472, filed Oct. 28, 2016, which claim priority to U.S. Provisional Application Ser. No. 62/248,178, filed Oct. 29, 2015, both of which are incorporated herein by reference in their entirety.

BACKGROUND OF THE INVENTION

1. Technical Field

This invention relates generally to textile sleeves, and more particularly to self-wrapping, braided textile sleeves.

2. Related Art

It is known to protect elongate members in textile sleeves against a variety of environmental conditions and affects, or to just contain elongate members in textile sleeves for bundling and routing purposes, such as in knit, woven or braided sleeves. In the case of braided sleeves, the braided wall is commonly braided as a circumferentially continuous, seamless wall, sometimes referred to as a 'closed' wall. One known advantage of a closed, braided wall construction is that the wall can be circumferentially expanded to facilitate sliding the wall over an elongated member by manually pushing and physically holding the opposite ends of the wall in a compressed fashion. By pushing the opposite ends toward one another and manually holding the wall in an axially compressed state, the braided wall is caused to take on an increased diameter and a reduced length. When in the increased diameter state, the wall can be readily disposed over the elongate member. Then, after sleeve is installed over the elongate member, the installer can release the wall and the opposite ends automatically spring axially away from one another, thereby taking on a circumferentially decreased diameter and increased length.

Although the aforementioned ability to increase and decrease the diameter of a braided wall has an advantage over some other known types of sleeve construction, such as woven sleeves, it does come with potential drawbacks. Namely, the ability to manually increase the diameter of the braided sleeve requires applying a continual, externally applied compression force during installation, which can prove challenging, and thus, can complicate the ability of the installer to readily install the sleeve over the elongate member. Further complicating installation of a braided sleeve arises when the sleeve has a relatively long length. With the sleeve having a relatively long length, difficulty arises by having to axially compress the opposite ends toward one another without causing the sleeve to fold or buckle along the length of the sleeve. In addition, upon releasing the wall to have the sleeve resume its lengthened, decreased diameter state, the wall generally has a tendency to spring back, at least partially, toward its axially compressed configuration due to a pattern retention phenomenon caused by friction between the interlaced yarns. As such, the effective length of the sleeve can be unintentionally decreased.

It is further known to construct sleeve having lengthwise extending, opposite free edges that are separable away from one another to allow the sleeve to be readily disposed about the elongate member to be protected. However, challenges can still arise in assembly of the sleeve about the elongate member, particularly when the sleeve has a relatively long length.

SUMMARY OF THE INVENTION

In accordance with one aspect of the invention, a self-wrapping protective textile sleeve is provided. The sleeve includes a braided, tubular wall having opposite free edges extending lengthwise between opposite ends. The wall has a first state with a decreased length, increased cross-sectional area and a second state with an increased length, decreased cross-sectional area, as viewed in cross-section taken generally transversely to a central longitudinal axis. The wall further includes braided, heat-set yarns imparting a bias on the wall, wherein the bias causes the wall to self-wrap into a tubular configuration and to remain substantially in the first and second states absent some externally applied force.

In accordance with one aspect of the invention, at least some of the heat-set yarns are braided in bundles, wherein the bundles include a plurality of yarns twisted with one another in helical relation.

In accordance with another aspect of the invention, at least some the bundles have loops interlinked with loops of another bundle.

In accordance with another aspect of the invention, at least some of the bundles of twisted yarn can be formed entirely of heat-settable yarns.

In accordance with another aspect of the invention, at least some of the bundles of twisted yarn can include non-heat-settable yarn and heat-settable yarn.

In accordance with another aspect of the invention, at least some of the bundles of twisted yarn can be formed entirely of non-heat-settable yarns.

In accordance with another aspect of the invention, the wall can include non-heat-settable yarn interlaced through loops of at least some of the bundles of twisted yarn.

In accordance with another aspect of the invention, the wall can include a plurality of non-heat-settable yarns interlaced through loops of at least some of the bundles of twisted yarn.

In accordance with another aspect of the invention, the non-heat-settable yarns interlaced through loops of at least some of the bundles of twisted yarn can be provided as bundles including a plurality of non-heat-settable yarns arranged in side-by-side relation with one another with the bundles of non-heat-settable yarns extending through common loops with one another.

In accordance with another aspect of the invention, the wall can include bundles of heat-settable twisted yarn braided solely in a single helical direction, thereby reducing the weight and cost of material content of the sleeve.

In accordance with another aspect of the invention, at least some of the yarns can include a non-heat-settable multifilament yarn twisted or served with a heat-set monofilament yarn, thereby enhancing the coverage protection provided by the wall.

In accordance with another aspect of the invention, the wall can snap between the first and second states upon overcoming the bias imparted by the heat-set yarns.

In accordance with another aspect of the invention, the wall can have a first diameter in the reduced length first state and a second diameter in the increased length second state, wherein the first diameter is greater than the second diameter.

In accordance with another aspect of the invention, the wall can have a non-circular outer periphery, thereby allowing the wall to conform to similarly shaped, non-circular components.

In accordance with another aspect of the invention, the opposite free edges can be biased into overlapping relation with one another via heat-set yarns.

In accordance with another aspect of the invention, a method of constructing a self-wrapping textile sleeve is provided. The method includes braiding a plurality of yarns with one another to form a wall extending lengthwise along a central longitudinal axis. The method further includes providing at least some of the yarns as being heat-settable yarns and forming the wall so that it is moveable between a decreased length, increased cross-sectional area first state and an increased length, decreased cross-sectional area second state. The method further includes forming the wall having opposite free edges extending lengthwise between opposite ends of the wall. Further yet, the method includes heat-setting the heat-settable yarns while the wall is in one of the first state and second state to impart a bias on the wall via the heat-set yarns, with the bias causing the wall to self-wrap into a tubular configuration and to remain in each of the first and second states absent an externally applied axial force causing the wall to be moved to the other of the first or second state.

In accordance with another aspect of the invention, the method can further include braiding the wall using a lace-braiding machine.

In accordance with another aspect of the invention, the method can further include braiding the wall as a seamless, circumferentially continuous wall and then include cutting the wall lengthwise to form the opposite free edges.

In accordance with another aspect of the invention, the method can further include performing the heat-setting step prior to performing the cutting operation on the seamless, circumferentially continuous wall.

In accordance with another aspect of the invention, the method can further include performing the heat-setting step after performing the cutting operation on the seamless, circumferentially continuous wall.

In accordance with another aspect of the invention, the method can further include initially braiding the wall as a substantially flat layer having opposite free edges.

In accordance with another aspect of the invention, the method can further include wrapping the braided flat layer about a mandrel and then performing the heat-setting operation.

In accordance with another aspect of the invention, the method can further include forming bundles of the yarns by twisting at least some of the yarns together and braiding the bundles with one another.

In accordance with another aspect of the invention, the method can further include forming loops in at least some of the bundles and interlinking loops from one of the bundles with loops of another of the bundles to effectively lock the bundles together, thereby enhancing the effect of the bias that causes the tubular wall to remain in each of the first and second states absent an externally applied axial force.

In accordance with another aspect of the invention, the method can further include forming at least some of the bundles including heat-settable yarns.

In accordance with another aspect of the invention, the method can further include forming at least some of the bundles entirely with the heat-settable yarns.

In accordance with another aspect of the invention, the method can further include forming all of the bundles of twisted yarns entirely with the heat-settable yarns to enhance the heat-shape retention capacity of the wall.

In accordance with another aspect of the invention, the method can further include forming the wall in its entirety with heat-settable yarns to optimize the heat-shape retention capacity of the wall.

In accordance with another aspect of the invention, the method can further include interlacing non-heat-settable yarns with at least some of the bundles of twisted yarns to enhance the coverage protection provided by the wall.

In accordance with another aspect of the invention, the method can further include interlacing non-heat-settable yarns through at least some of the loops of at least some of the bundles of twisted yarns to enhance the coverage protection provided by the wall.

In accordance with another aspect of the invention, the method can further include forming at least some of the bundles including non-heat-settable yarn to enhance the coverage protection of the sleeve.

In accordance with another aspect of the invention, the method can further include forming at least some of the bundles including a plurality of non-heat-settable yarns arranged in side-by-side, non-twisted relation with one another to enhance the coverage protection of the sleeve.

In accordance with another aspect of the invention, the method can further include extending the bundles of non-heat-settable yarns arranged in side-by-side relation with one another through common loops of other bundles of twisted yarns to enhance the coverage protection of the sleeve.

In accordance with another aspect of the invention, the method can further include forming at least some of the bundles including heat-settable yarns twisted with non-heat-settable yarns to enhance the coverage protections provided by the wall.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 1 is a schematic perspective view of a self-wrapping textile sleeve constructed in accordance with one aspect of the invention shown disposed about an elongate member to be protected;

FIG. 2A is a plan view of the self-wrapping textile sleeve of FIG. 1 shown in a flattened, unwrapped, axially compressed, decreased length first state;

FIG. 2B is a plan view of the self-wrapping textile sleeve of FIG. 1 shown in a flattened, unwrapped, axially expanded, increased length second state;

FIG. 8D is a view similar to FIG. 5 showing an enlarged fragmentary view of a wall of a self-wrapping textile sleeve constructed in accordance with yet another aspect of the invention;

FIG. 8E is a view similar to FIG. 5 showing an enlarged fragmentary view of a wall of a self-wrapping textile sleeve constructed in accordance with yet another aspect of the invention;

DETAILED DESCRIPTION OF PRESENTLY PREFERRED EMBODIMENTS

Figure 4A:
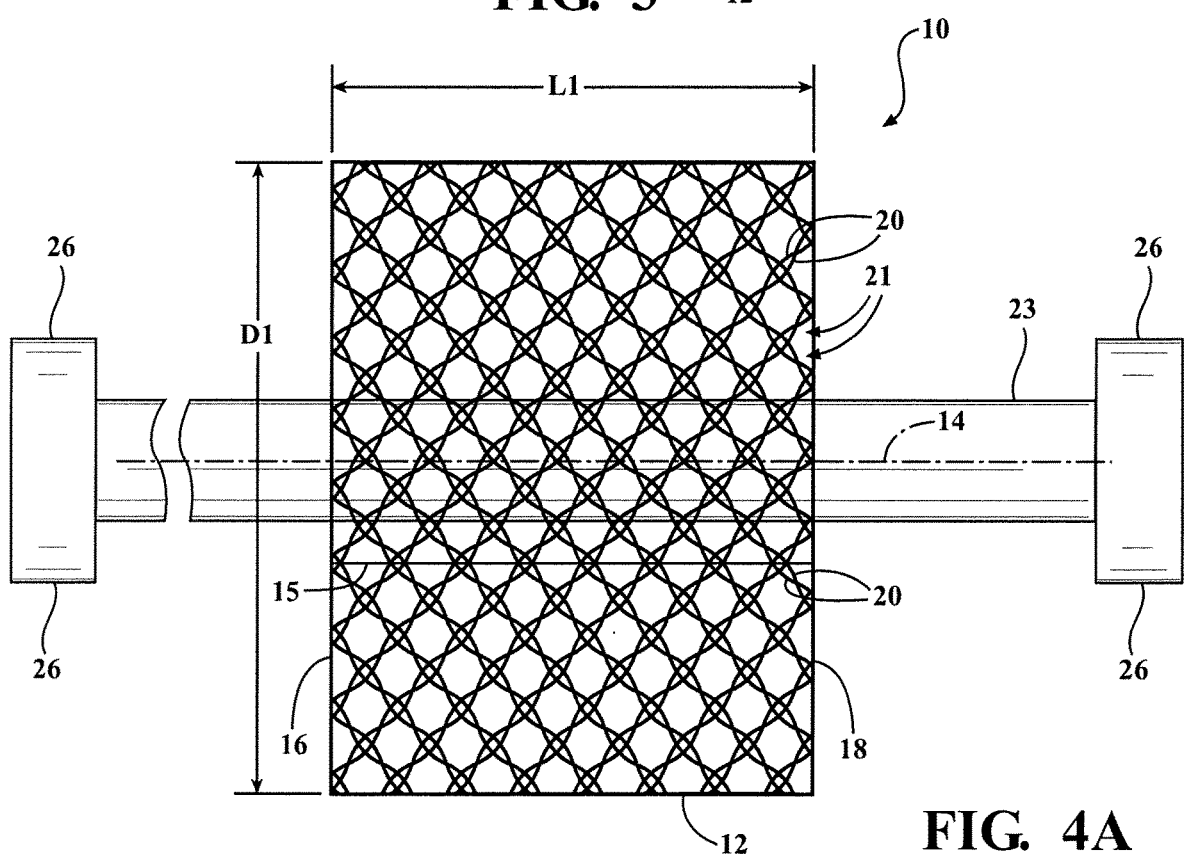
FIG. 4A is a schematic side view of the self-wrapping textile sleeve of FIG. 1 shown disposed about an elongate member to be protected while in the axially compressed, reduced length first state.
Figure 4B:
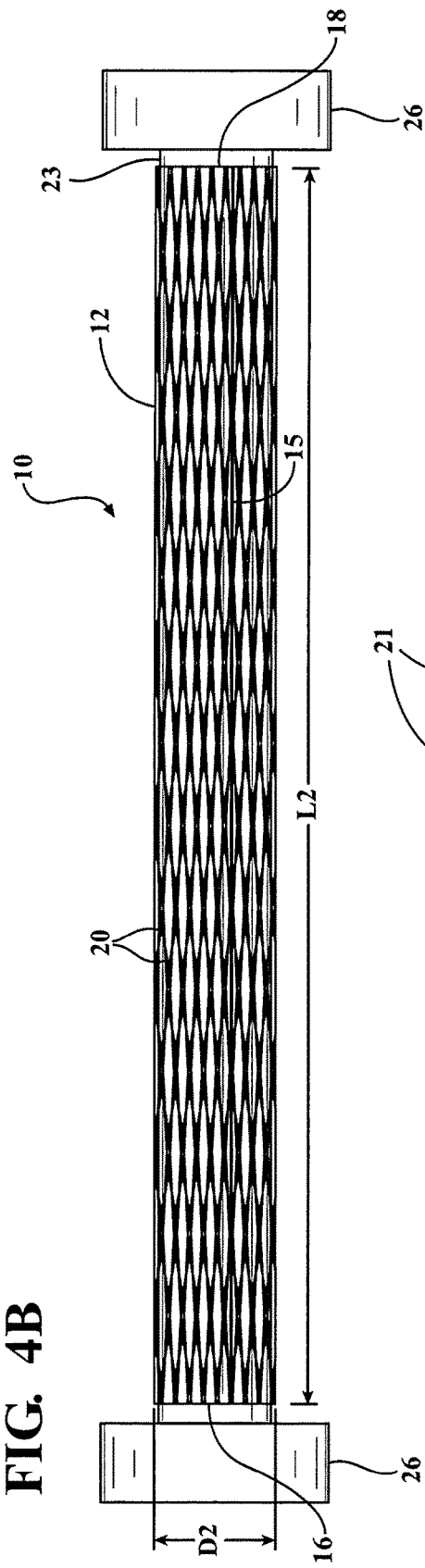
FIG. 4B is a schematic side view of the self-wrapping textile sleeve of FIG. 1 shown disposed about the elongate member to be protected in the axially extended, increased length second state.

Referring in more detail to the drawings, FIGS. 1 and 4A-4B illustrate a braided, self-wrapping textile sleeve, referred to hereafter as sleeve 10, constructed in accordance with one aspect of the invention. The sleeve 10 has a braided, circumferentially discontinuous wall 12 having opposite free edges 13, 15 extending lengthwise in generally parallel relation to a central longitudinal axis 14 between opposite open ends 16, 18. The wall 12 is axially compressible to attain a pre-assembled first state, having a decreased length L1 and increased diameter D1 and/or increased cross-sectional area, as viewed in lateral cross-section taken generally transversely to the central longitudinal axis 14 (FIG. 4A), and is axially extendible to attain a fully assembled second state, having an increased length L2 and decreased diameter D2 and/or decreased cross-sectional area (FIGS. 1 and 4B). The wall 12 includes heat-settable, braided yarn 20, which, upon being heat-set, causes at least a portion of the wall 12, in which the heat-set yarn 20 is contained, to remain in, or substantially in, a selected one of the first and second states absent some externally applied force. An externally applied force can be selectively applied to overcome the bias, thereby axially contracting and extending the wall 12 between the first and second states, as desired. The heat-set yarn 20 imparts a bias on the wall 12, and upon overcoming the bias via an externally applied force, the wall 12 then attains a newly selected state, whether the first or second state, until the wall 12 is further acted on by another suitable external force to again move the wall 12 to a different stable configuration, whereupon the wall 12 remains substantially in the new stable configuration until acted on by yet another suitable external force. Accordingly, the wall 12 has bi-stable, self-sustaining axially compressed first and axially extended second states, though it should be recognized that the wall 12 is able to be readily manipulated to take-on multi-stable configurations as a result of being able to manipulate as many discrete regions of the wall 12 between the opposite ends 16, 18 between the first and second states as desired.

The wall 12 is preferably braided on a lace-braiding machine as a circumferentially continuous tube, or as a flat layer, though other braiding mechanisms are contemplated herein. If braided as a circumferentially continuous tube, the tube is subsequently cut lengthwise, such as via a hot knife, blade or wire, by way of example and without limitation, to form the opposite, lengthwise extending edges 13, 15 extending generally parallel to the central longitudinal axis 14. The lengthwise cutting process can be performed after cutting the tubular wall 12 to the desired length of the finished sleeve 10, or alternately, the tubular wall 12 can be cut lengthwise prior to cutting the tubular wall 12 lengthwise to form the opposite edges 13, 15. In addition, regardless of when the circumferentially continuous, tubular wall 12 is cut lengthwise, the wall 12 can be heat-set while in the decreased length L1 and increased diameter D1 and/or increased cross-sectional area first state either prior to cutting the wall 12 lengthwise, or after cutting the wall 12 to the desired length. Otherwise, if formed as a flat layer, the flat layer can be subsequently wrapped about a mandrel 17 (FIG. 3), with the opposite edges 13, 15 being wrapped toward one another, and more preferably with the opposite edges 13, 15 being brought in to overlapping relation with one another, and preferably while in the decreased length L1 and increased diameter D1 and/or increased cross-sectional area first state, and then the heat-settable yarns within the wall 12 can be heat-set about the mandrel 17.

In accordance with one aspect of the invention, the yarn, whether provided entirely or only partially from heat-settable yarns, can be braided, at least in part, as bundles 21 of yarn, wherein the bundles 21 include a plurality of ends of yarn that can be twisted with one another, one yarn in an S-direction and the other yarn in a Z-direction, thereby allowing the separate bundles 21 of yarn to be braided as a single yarn. The embodiment illustrated in FIGS. 1 and 4A-4B can be constructed, at least in part, with individual bundles 21 braided with one another, with each bundle 21 including a plurality, shown as a pair of yarns (FIG. 5), twisted with one another. It should be recognized that more than 2 ends of yarn could be bundled with one another if desired for the intended application. The individual bundles 21 of twisted yarns can be braided in a single S or Z direction or in both S and Z directions (with S representing a first helical direction and Z representing an opposite helical direction). The bundles 21 are shown as being interlinked with one another at cross-over locations by interlinked, circumferentially closed openings or loops 22 formed within each of the respective twisted pairs of yarns 21, and thus, the individual pairs of bundled yarns 21 are effectively interlinked and locked together such that they are inseparable from one another. The interlinking of the loops 22 greatly enhances the effect of the bias imparted in the heat-set yarns 20 to move the wall 12 between the first and second bi-stable states and also facilitates maintaining the wall 12 or portion of the wall 12 in the selected state, while further acting to prevent enlarged openings from being formed between relatively shifted yarns; however, it is contemplated herein that the yarns could be braided without being linked together, though it is with the understanding that the stable states discussed above are likely to be much less pronounced.

Figure 3:
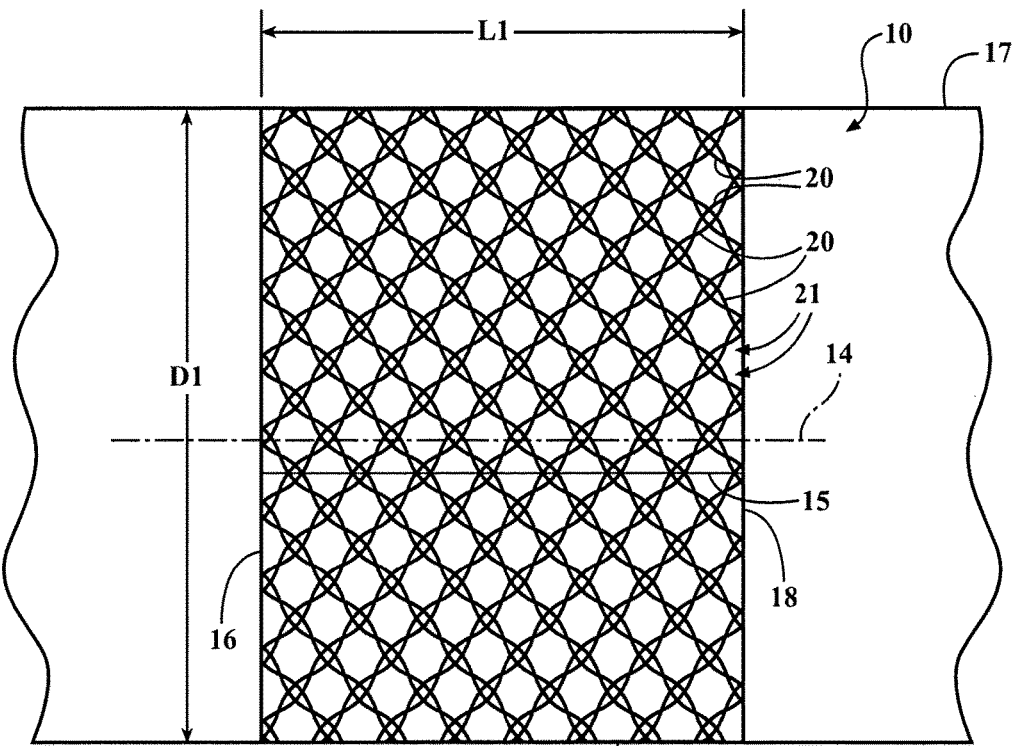
FIG. 3 is a schematic side view of the self-wrapping textile sleeve of FIG. 1 constructed in accordance with one embodiment of the invention shown wrapped about a mandrel in the axially compressed, reduced length first state.

Upon braiding the wall 12, as discussed above, whether as a circumferentially continuous, seamless tube or as a flat layer of material, the heat-settable yarn 20, which can be provided as a heat-settable monofilament and/or a heat-settable multifilament, such as from nylon, polyphenylene sulfide (PPS) or polyethyleneterephthalate (PET), having a diameter between about 0.1-0.40 mm, by way of example and without limitation, is then heat-set while the wall 12 in a selected configuration, such as in a fully or at least partially axially compressed, reduced length state (FIG. 3). As mentioned, if constructed as a seamless, tubular wall 12, the heat-setting process can be performed prior to, or after cutting the wall 12 lengthwise to form the opposite edges 13, 15; however, if performed after cutting the wall 12, the opposite edges 13, 15 can be wrapped into overlapping relation similar to that described above for the flat layer, thereby acting to provide an enhanced overlap of the opposite edges 13, 15 after heat-setting the heat-settable yarn 20 to be biased the edges 13, 15 into a circumferentially closed configuration, thereby rendering the wall 12 self-wrapping. It should be further noted that if formed as a seamless, circumferentially tubular wall, the lengthwise cutting process results in the opposite edges 13, 15 having cut yarns, though, it is contemplated that if cut with a heated blade or wire, the yarns can be fused to one another at the cut edges 13, 15, thereby acting to prevent fraying. Otherwise, if braided as a flat wall 12, the yarns can be braided to reverse helical direction, from S to Z and/or vice versa, at one or both of the edges 13, 15, thereby forming the edges 13, 15 with enhanced, fray resistant integrity and smoothness.

Figure 5:
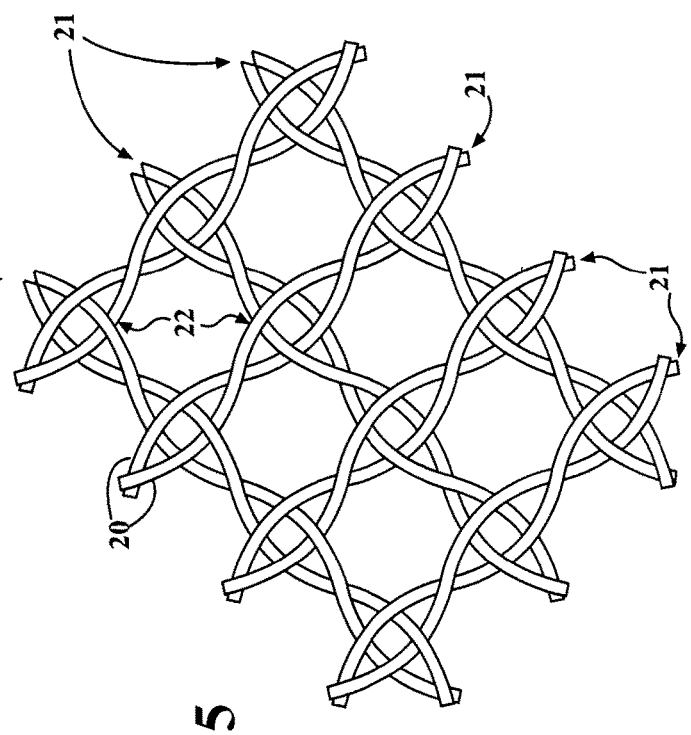
FIG. 5 is an enlarged fragmentary view of a wall of the self-wrapping textile sleeve of FIG. 1 constructed in accordance with one aspect of the invention.

For maximum spring bias between the reduced length L1, increased cross-sectional area first state and increased length L2, decreased cross-sectional area second state, the entire wall 12 can be formed from twisted bundles of heat-settable monofilaments 20, such as shown in FIG. 5, by way of example and without limitations, though, if desired to provide additional types of protection other than abrasion, such as, enhanced coverage, thermal, acoustic or electromagnet interference (EMI), for example, at least some of the yarns can be provided as non-heat-settable yarn 24 (FIG. 7), such as a mineral fiber, e.g. basalt, silica, or ceramic or fiberglass, or as flexible conductive filaments, such as from wire, metal coated polymeric yarn filaments, or hybrid yarns including a conductive filament or non-conductive filament served or twisted with another yarn filament, such as a heat-settable or non-heat-settable monofilament and/or multifilament, for example. As such, the individual twisted bundles 21 could include a desired number of heat-settable ends of yarn 20 and a desired number of non-heat-settable ends of yarn 24, as long as enough heat-settable yarns 20 are included to impart the bias necessary to maintain the wall 12 in its first and second positions. If the wall 12 includes a relatively low percentage of number of ends of heat-settable yarns 20 relative to the number of ends of non-heat-settable yarns 24, such less than 50% content, by way of example and without limitation, the diameter of the individual heat-settable yarns 20 can be increased, thereby being at the upper limit of the diameter range, to impart an increased bias as compared to if the heat-settable yarns 20 were provided toward the lower limit of the diameter range.

As discussed above, prior to heat-setting the heat-settable yarn 20, the opposite ends 16, 18 of the wall 12 are axially compressed toward one another until the wall 12 is brought to its radially expanded, increased diameter D1 and/or increased cross-sectional area (the area bounded by the wall 12 as viewed in lateral cross-section taken generally transversely to the central longitudinal axis 14), reduced length L1, first state, and then a suitable degree of heat is applied to the heat-settable yarn 20, thereby causing the heat-settable yarn 20 to take-on a heat-set. Upon being heat-set, aside from having its opposite edges 13, 15 biased into overlapping relation with one another to render the wall 12 as a self-wrapping wall (if heat-set while the opposite edges 13, 15 are in overlapping relation with one another), the wall 12 attains a bias imparted by the heat-set yarn 20 that tends to maintain the wall 12 in the selected in-use second state configuration having an axially extended length L2, reduced diameter D2 and/or reduced cross-sectional area (FIGS. 1 and 4B) or the in the pre-assembly first state configuration having an axially reduced length L1, radially expanded diameter D1 and/or increased cross-sectional area (FIG. 4A). Regardless of which state the sleeve 10 is in, the sleeve 10 remains in that state until a sufficient externally applied, axial force is applied to overcome the bias imparted by the heat-set yarn 20. When a suitable force is applied to the wall 12, generally along the direction central longitudinal axis 14 of the sleeve 10, the portion or section of the wall 12 acted on by the axial force snaps, springs, causes the wall 12 to move from one state to the other, whereupon the wall 12 remains in the selected state until acted on again by a suitable external, axially applied force, whether going from the first state to the second state, or vice versa. As such, it should be recognized, the entire length of the wall 12 can be formed into one of the decreased length, first state or increased length, second state, or any number of discrete lengthwise extending portions or segments of the wall 12 can be manipulated to change between the aforementioned first and second states, as desired. Accordingly, axially extending segments of the wall 12 adjacent one another can be biased to remain in different ones of the first and second states from one another, if desired, thereby allowing the wall 12 to take on a varying outer profile along its length.

Figure 9:
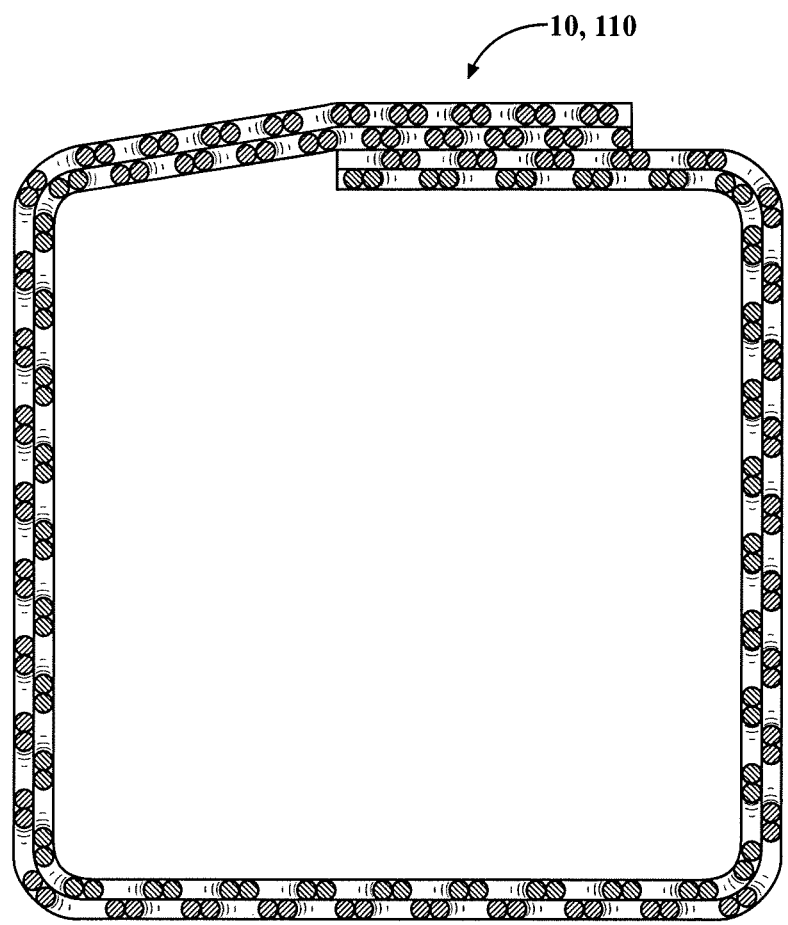
FIG. 9 is a cross-sectional view of a self-wrapping textile sleeve constructed in accordance with yet another aspect of the invention.

Prior to the heat-setting step, the wall 12 of the sleeve, while being compressed axially to the reduced length L1, first state, the outer periphery of the wall 12 can be shaped to be other than circular. Accordingly, the outer periphery can be formed into a non-circular shape as viewed in lateral cross-section taken generally transversely to the central longitudinal axis 14. The non-circular shape can be any desired shaped as may be beneficial for the particular end-use application, such as square, rectangular, triangular, or any polygonal, non-circular shape. Then, upon forming the wall 12 into the reduced length L1, first state, and upon configuring the outer periphery of the wall 12 into the desired cross-sectional shape, the heat can be applied to the wall 12 to impart the heat-set into the heat-settable yarn 20, thereby providing the wall 12 with the bi-stable functionality, as well as forming the outer periphery into the selected shape, whether circular or non-circular, as viewed in lateral cross-section (FIG. 9).

During assembly of the sleeve 10 about an elongate member 23 to be bundled and protected, such as a wire harness, conduit, or otherwise, the wall 12 can be axially compressed along its central longitudinal axis 14 to a fully or partially compressed first state (FIG. 4A), wherein the wall 12 remains in, or substantially in the first state absent some externally applied forced sufficient to move the wall 12 to a different configuration. If the wall 12 is relatively long, such as about 2 ft or longer, separate lengthwise extending regions can be axially compressed until the entire wall 12 is axially compressed at least in part, thereby making it easy to transform the entire length of the wall 12 to the first, axially compressed state. As such, the sleeve 10 takes on an increased diameter D1 and/or increased cross-sectional area, which allows the wall 12 to be more easily and readily opened, via spreading the opposite edges 13, 15 away from one another, and disposed about the elongate member 23 to be protected, as well as about any enlarged connectors or fittings 26 attached thereto. Then, upon disposing the radially expanded wall 12 about the elongate member 23, an axially applied tensile force can be applied to the wall 12, such as by pulling at least one of the opposite ends 16, 18 axially away from the other of the opposite ends 16, 18, thereby causing the wall 12 to extend axially and snap or spring from the radially expanded, reduced length first state to the radially contracted, increased length second state, such as shown schematically in FIG. 4B, by way of example and without limitation. It should be recognized that any portion or portions of the wall 12 can be lengthened from the reduced length state L1, as desired, while leaving the remaining portion or portions in the first, axially compressed, radially expanded state if desired. As such, the wall 12, which can be braided to extend over any desired axial length, can be extended axially over the desired length of the elongate member 23 to be protected. With the wall 12 being moved to the increased length L2, reduced diameter D2 and/or reduced cross-sectional area second state, the wall 12 is able to contain the elongate member 23, such as a wire harness, for example, in the desired envelope to allow the elongate member 23 to be neatly bundled and routed, as desired. Further, in addition to the braided wall 12 acting to bundle the elongate member 23, particularly in the case of a wire harness having a plurality of individual, exposed wires, the wall 12 acts to provide protection to the elongate member 23 against abrasion, particularly if the heat-settable yarn 20 is provided as a monofilament. It should be recognized that the picks-per-inch can be provided, as desired, to provide the coverage needed for the intended application. As such, if less coverage is needed, a reduced picks-per-inch can be used, and if more coverage is needed, and increased picks-per-inch can be used. Further yet, the picks-per-inch can be varied over the length of the wall 12, as desired for the intended application. With less coverage, a benefit of seeing through the wall 12 is attained, thereby being able to see the contents within the sleeve, such as individual colors of separate wires, by way of example and without limitation. Otherwise, if provided with increased coverage, added protection against the ingress of contamination or enhanced acoustic and/or thermal protection can be provided.

Figure 6A:
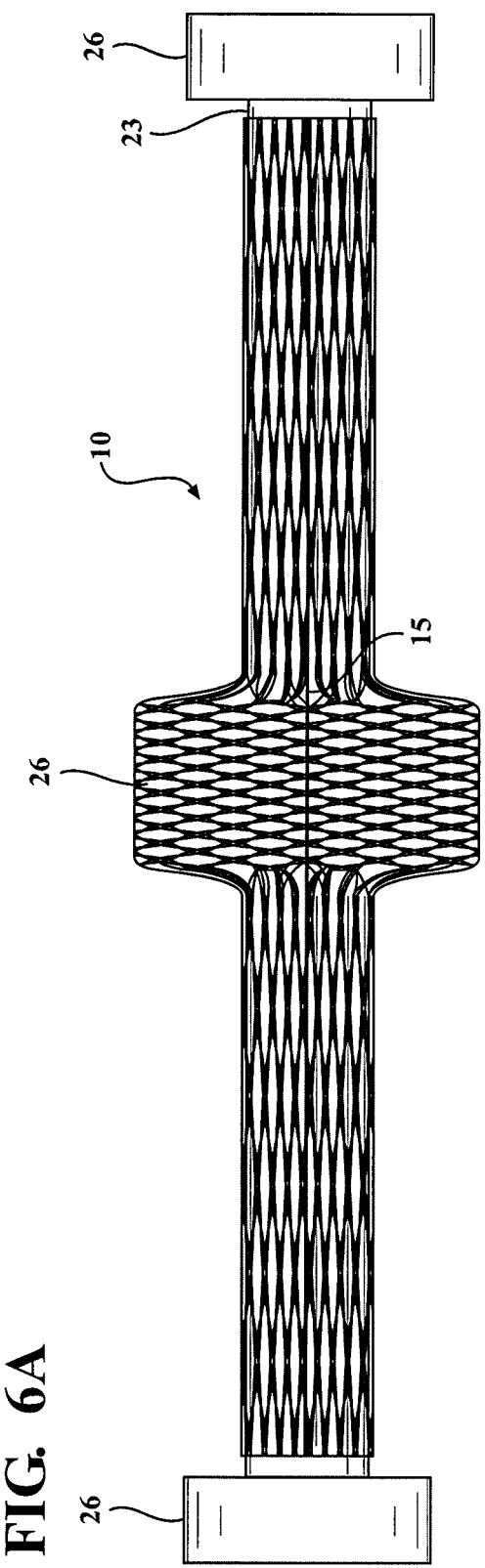
FIG. 6A is a view similar to FIG. 4B showing the self-wrapping textile sleeve disposed about an elongate member having a centrally located connector.
Figure 6B:
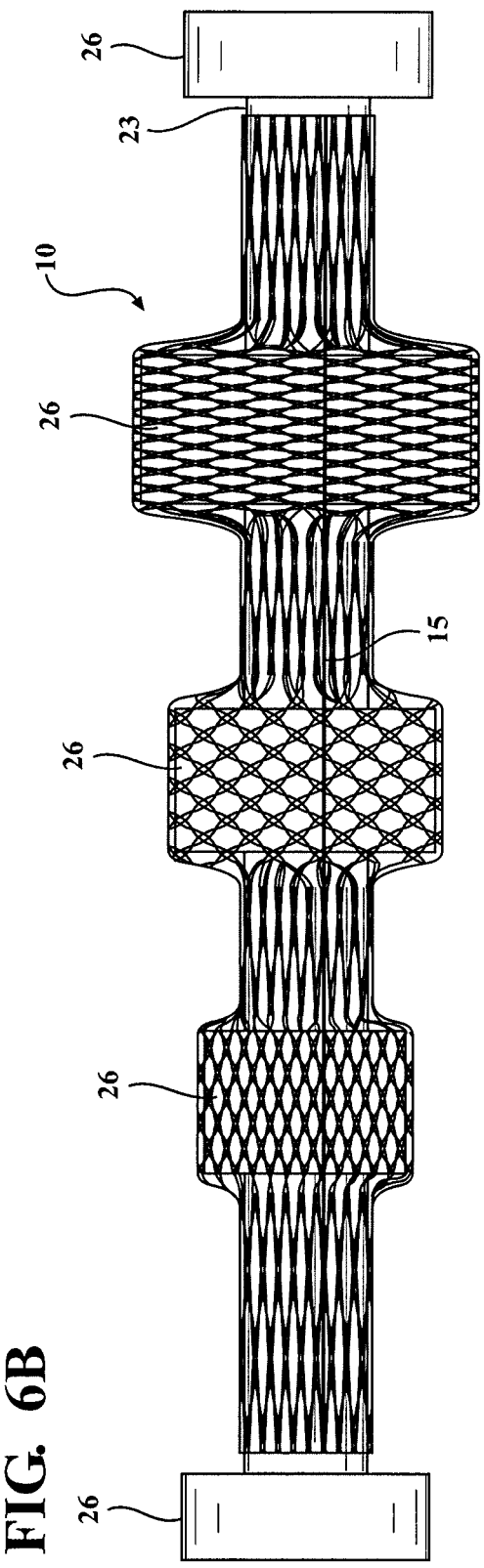
FIG. 6B is a view similar to FIG. 6A showing the self-wrapping textile sleeve disposed about an elongate member having a plurality of intermediately located connectors.

In FIG. 6A, the sleeve 10 is shown extending about an elongate member 23 having a centrally located connector 26 between opposite end connectors 26. The ability of the sleeve 10 to remain expanded locally in the first state over a portion of the length of the sleeve 10 allows the wall 12 to accommodate the central connector 26, wherein the remaining portion of the sleeve 10 can be readily extended lengthwise to the second state upon assembly. It should be recognized that any number of expanded regions in the first state and contracted regions in the second state can be formed between the opposite ends 16, 18 of the sleeve 10, as desired, such as shown in FIG. 6B, wherein the elongate member 23 includes a plurality of intermediate connectors 26 to be received within the sleeve 10, thereby allowing the sleeve 10 to accommodate and conform to a multitude of different radial dimensions and undulations of the elongate member 23 along the length of the sleeve 10.

Figure 7:
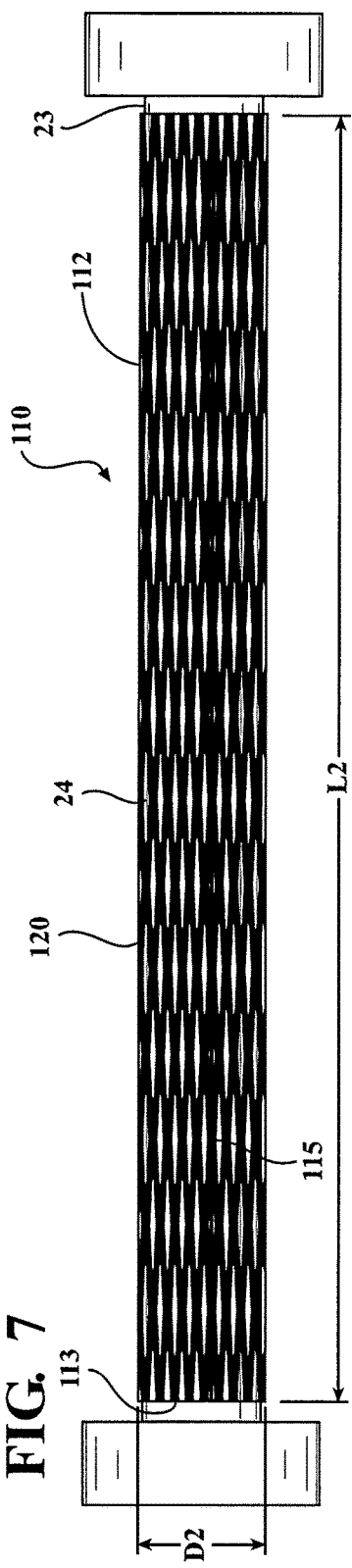
FIG. 7 is a view similar to FIG. 4B showing a self-wrapping textile sleeve constructed in accordance with another aspect of the invention shown disposed about an elongate member to be protected.

In FIG. 7, a self-wrapping textile sleeve 110 constructed in accordance with another aspect of the invention is shown, wherein the same reference numerals as used above, offset by a factor of 100, are used to identify like features. The sleeve 110 has a braided, wrappable wall, identified generically by reference numeral 112, including heat-settable yarns 120, as discussed above, wherein upon being heat-set, impart a bias on the wall 112 that causes the wall 112 to remain in selected first and second states, and can further impart a bias to bring the opposite edges 113, 115 into overlapping relation with one another, if heat-set while the opposite edges are in overlapped relation with one another, as discussed above. As such, absent some externally applied force causing the wall 112 to move, the wall 112 remains in a selected one of the first and second states. As discussed above, an externally applied force can be selectively applied to the wall 112, in its entirety or to a discrete region, to move the wall 112 or portion thereof from one of the first and second states to the other of the first and second states, as desired. The wall 112 of the sleeve 110 further includes non-heat-settable yarns 124 braided with the heat-settable yarns 120. The non-heat-settable yarns 124 can be provided as a multifilament yarn and/or a monofilament yarn, from non-heat-settable materials discussed above to provide the desired type of protection. If provided as a multifilament yarn, enhanced coverage is provided to protect the elongate member 23 against contamination from external debris. Further, the multifilaments enhance the softness to the sleeve 110, thereby reducing the abrasive effects of the wall 112 against neighboring objects. A plurality of braid patterns are contemplated for the wall 112, with those embodiments discussed hereafter.

Figure 8A:
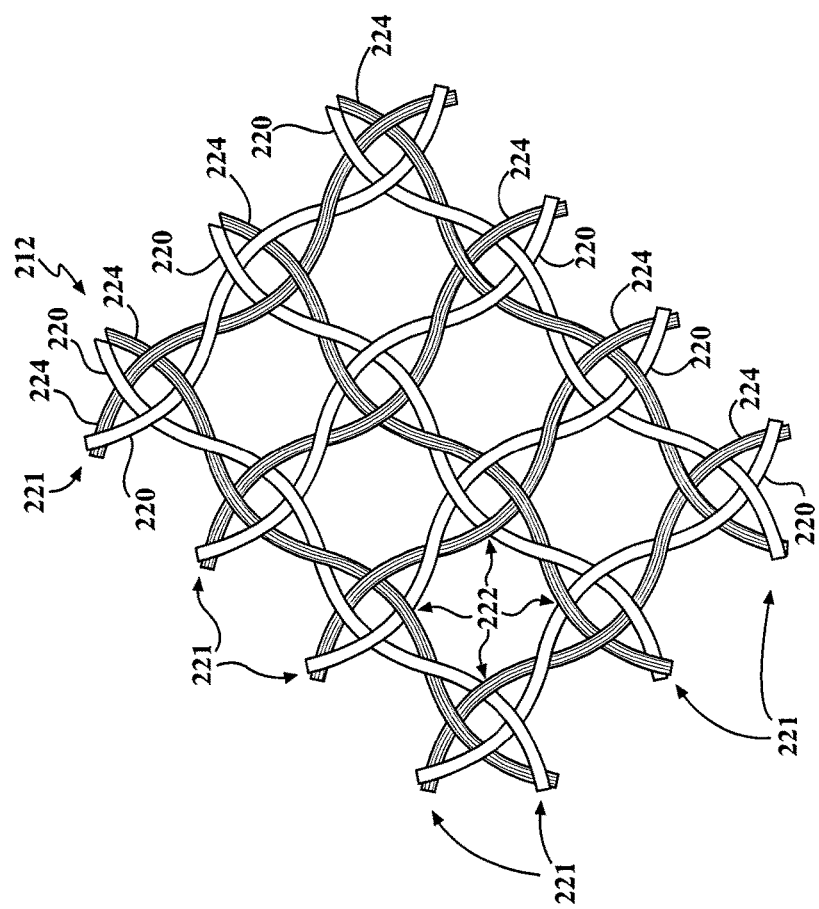
FIG. 8A is a view similar to FIG. 5 showing an enlarged fragmentary view of a wall of a self-wrapping textile sleeve constructed in accordance with another aspect of the invention.

As shown FIG. 8A, one embodiment of a self-wrapping wall 212 of the sleeve 110 of FIG. 7 is shown, wherein the same reference numerals as used above, offset by a factor of 200, are used to identify like features, wherein an enlarged fragmentary portion of the wall 212 is shown for simplicity, with it being understood that the remaining portion of the wall 212 is the same. The wall 212 includes the non-heat-settable yarns 224, which are shown as being bundled in twisted relation with the heat-settable yarns 220 to form discrete bundles 221, shown as a single non-heat-settable yarn 224 being twisted with a single heat-settable yarn 220, by way of example and without limitation. The discrete bundles 221 are braided with one another to form the entirety of the wall 212, with each of the loops 222 of each bundle shown as being interlinked with loops 222 of another bundle 221, in accordance with another aspect of the invention. As such, each of the bundles 221 provide a dual benefit of being able to impart a bias upon the heat-settable yarn 220 being heat-set, while each bundle also provides enhanced coverage protection via inclusion of a non-heat-settable yarn 224, such as a relatively bulky multifilament, for example.

Figure 8B:
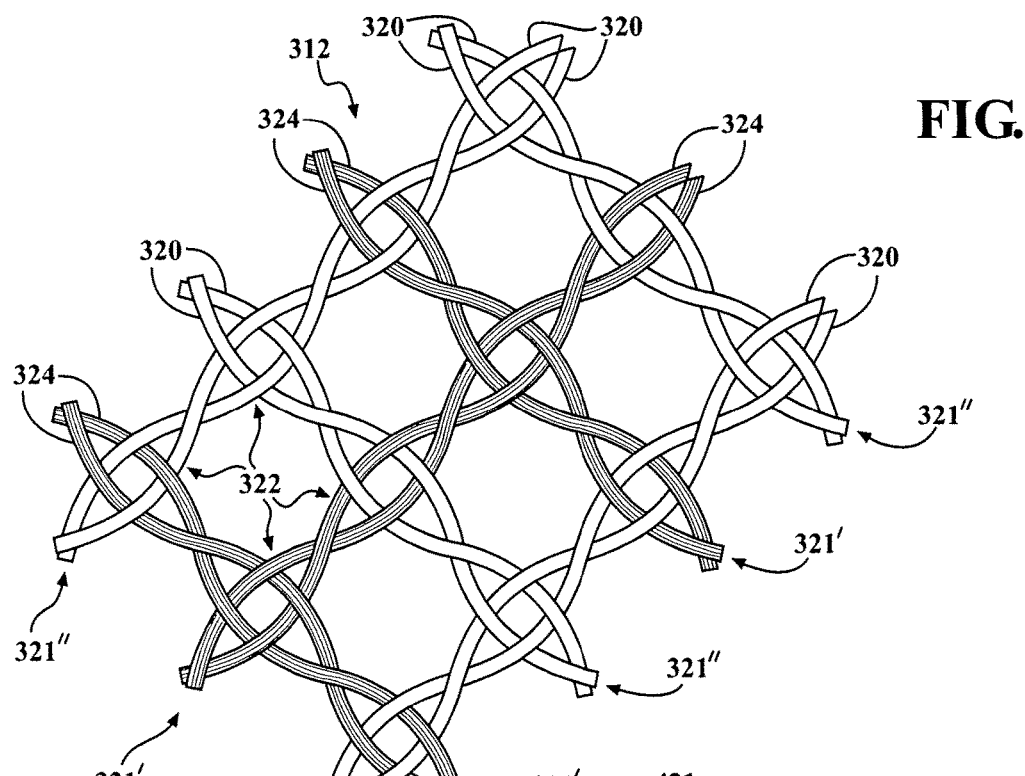
FIG. 8B is a view similar to FIG. 5 showing an enlarged fragmentary view of a wall of a self-wrapping textile sleeve constructed in accordance with yet another aspect of the invention.

In FIG. 8B, another embodiment of a self-wrapping wall 312 of the sleeve 110 of FIG. 7 is shown, wherein the same reference numerals as used above, offset by a factor of 300, are used to identify like features, wherein an enlarged fragmentary portion of the wall 312 is shown for simplicity, with it being understood that the remaining portion of the wall 312 is the same. The wall 312 includes the non-heat-settable yarns 324, which are shown as being bundled in twisted relation with one another to form discrete bundles 321' entirely of twisted non-heat-settable yarn, wherein the discrete bundles 321' can be braided with other bundles 321" containing heat-settable yarn 320, such as bundles of solely heat-settable yarn 320, with each of the loops 322 of each bundle 321', 321" shown as being interlinked with loops 322 of another bundle 321', 321", in accordance with another aspect of the invention. The twisted bundles 321' of non-heat-settable yarn 324 and twisted bundles 321" of heat-settable yarn 320 are shown as alternating with one another in each of the S and Z directions.

Figure 8C:
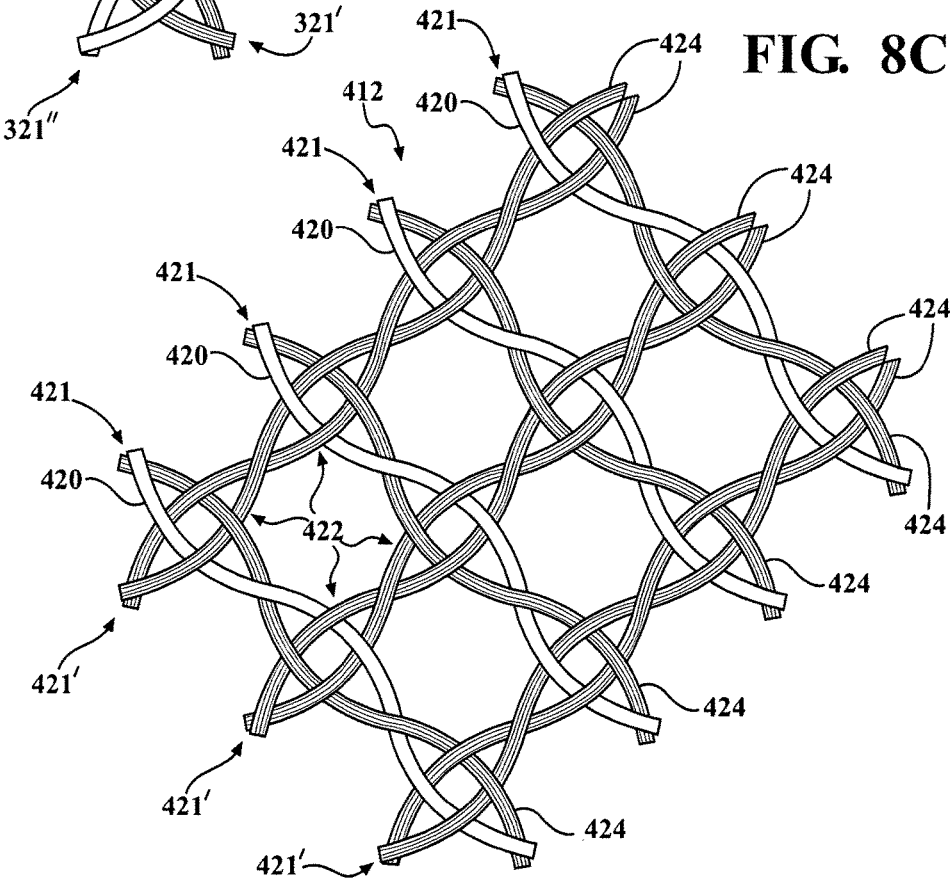
FIG. 8C is a view similar to FIG. 5 showing an enlarged fragmentary view of a wall of a self-wrapping textile sleeve constructed in accordance with yet another aspect of the invention.

In FIG. 8C, another embodiment of a self-wrapping wall 412 of the sleeve 110 of FIG. 7 is shown, wherein the same reference numerals as used above, offset by a factor of 400, are used to identify like features, wherein an enlarged fragmentary portion of the wall 412 is shown for simplicity, with it being understood that the remaining portion of the wall 412 is the same. The wall 412 includes the bundles 421' containing solely non-heat-settable yarn 424, wherein the discrete bundles 421' can be braided with other bundles 421 containing both heat-settable yarn 420 and non-heat-settable yarn 424, with each of the loops 422 of each bundle 420, 421' shown as being interlinked with loops 422 of another bundle 420, 421'. In this embodiment, the bundles 421 are shown as extending entirely in a first S or Z helical direction, while the bundles 421' are shown as extending entirely in an opposite second S or Z helical direction relative to the bundles 421. Accordingly, the use of the heat-settable yarns 420 is reduced, thereby adding to the degree of coverage provided by the non-heat-settable yarn 424, and further increasing the degree of flexibility of the sleeve 110.

In FIG. 8D, another embodiment of a self-wrapping wall 512 of the sleeve 110 of FIG. 7 is shown, wherein the same reference numerals as used above, offset by a factor of 500, are used to identify like features, wherein an enlarged fragmentary portion of the wall 512 is shown for simplicity, with it being understood that the remaining portion of the wall 512 is the same. The wall 512 includes the twisted bundles 521 containing solely heat-settable yarn 520, with the bundles 521 shown as extending in both the S and Z directions, such as described above with regard to the sleeve shown in FIG. 4B; in addition, the wall 512 also includes non-twisted, non-heat-settable yarn 524 extending in both the S and Z directions. The non-twisted, non-heat-settable yarn 524 is shown as being braided in pairs of side-by-side yarns, with each pair passing through a common loop 522 of the twisted bundles 521. Each of the non-twisted, non-heat-settable yarns 524 is braided such that each of the yarns 524 extending in an S-direction extend co-helically with and between bundles 521 extending in the S-direction and undulate over and under, in alternating fashion, the yarns 524 extending in a Z-direction, and also undulate over and under, in alternating fashion, corresponding heat-settable yarns 520 in the region of the loops 522. Likewise, each of the yarns 524 extending in a Z-direction extend co-helically with and between bundles 521 extending in the Z-direction and undulate over and under, in alternating fashion, the yarns 524 extending in a S-direction, and also undulate over and under, in alternating fashion, corresponding heat-settable yarns 520 in the region of the loops 522. As can be seen in the drawings, each yarn 520, 524 undulates over one yarn and then under the next yarn, thereby forming a plain braid, similar to a pattern that would be found in a plain weave, although braided, of course. The presence of the non-heat-settable yarn 524 functions to provide softness, flexibility and increased coverage protection to the sleeve 110, thereby providing enhanced protection against the ingress of contamination into the sleeve 110, as well as providing enhanced impact resistance. In the embodiment shown, a single pair of non-heat-settable yarn 524 extends between adjacent heat-settable bundles 521, in both the S and Z directions.

In FIG. 8E, another embodiment of a self-wrapping wall 612 of the sleeve 110 of FIG. 7 is shown, wherein the same reference numerals as used above, offset by a factor of 600, are used to identify like features, wherein an enlarged fragmentary portion of the wall 612 is shown for simplicity, with it being understood that the remaining portion of the wall 612 is the same. The wall 612 is similar in construction to the wall 512; however, rather than the twisted bundles being formed entirely of heat-settable yarn, the twisted bundles 621 extending in at least one of the S or Z directions, and shown as extending in both the S and Z directions, are provided as a heat-settable yarn 620 twisted with a non-heat-settable yarn 624. Otherwise, the wall 612 includes the non-twisted, non-heat-settable yarns 624 as discussed above for the wall 512. Accordingly, the wall 612 has a slightly reduced presence of heat-settable yarn 620, thereby lessening the bias imparted upon being heat-set, and a slightly increased presence of non-heat-settable yarn 624, thereby enhancing the coverage and impact resistance compared to the wall 512.

Figure 8F:
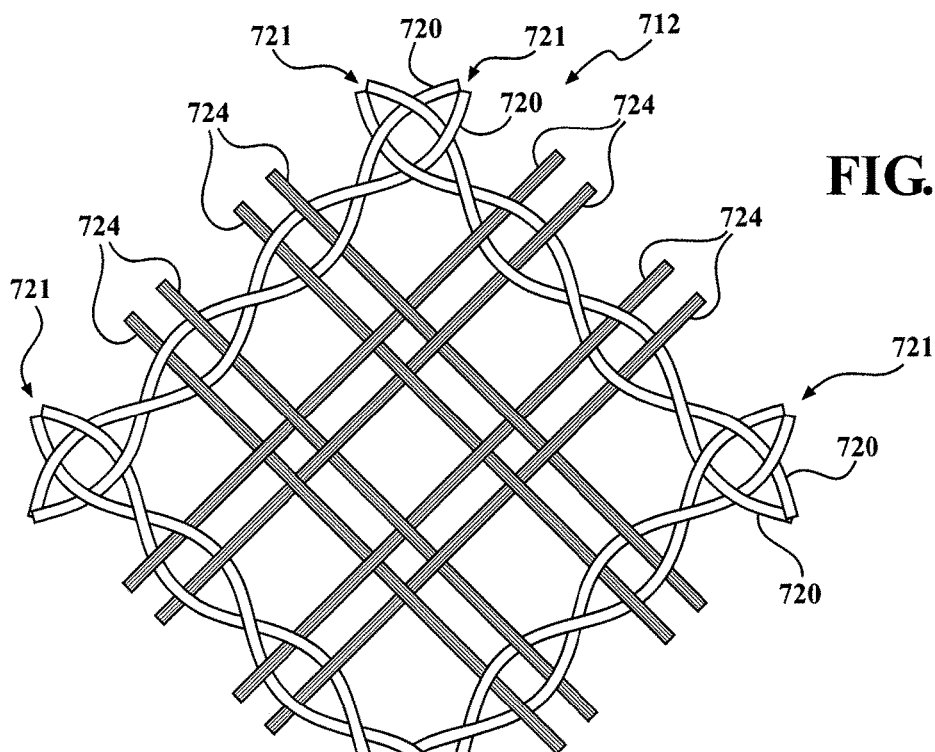
FIG. 8F is a view similar to FIG. 5 showing an enlarged fragmentary view of a wall of a self-wrapping textile sleeve constructed in accordance with yet another aspect of the invention.

In FIG. 8F, another embodiment of a self-wrapping wall 712 of the sleeve 110 of FIG. 7 is shown, wherein the same reference numerals as used above, offset by a factor of 700, are used to identify like features, wherein an enlarged fragmentary portion of the wall 712 is shown for simplicity, with it being understood that the remaining portion of the wall 712 is the same. The wall 712 is similar in construction to the wall 512; however, rather than having a single pair of non-twisted, non-heat-settable yarns extending between each twisted bundle 721 of heat-settable yarns 720, two separate pairs of non-twisted, non-heat-settable yarns 724 extend between each twisted bundle 721 of heat-settable yarns 720. As with the wall 512, each yarn 720, 724 undulates over one yarn and then under the next yarn, thereby forming a plain braid, similar to a pattern that would be found in a plain weave, although braided, of course. It should be recognized that the number of non-heat-settable yarns 724 extending between the heat-set bundles 721 could be different than as shown, depending on the requirements of the intended application. According, more non-heat-settable yarns 724 can be included where further enhanced coverage protection and impact resistance is desired.

Figure 8G:
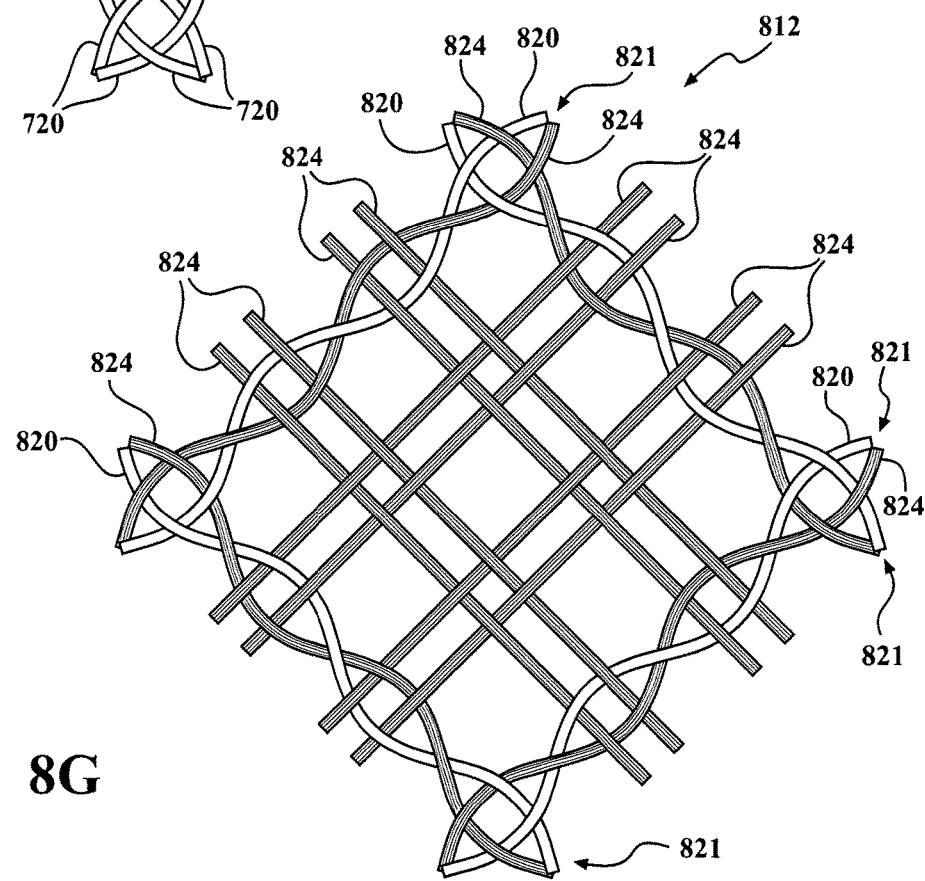
FIG. 8G is a view similar to FIG. 5 showing an enlarged fragmentary view of a wall of a self-wrapping textile sleeve constructed in accordance with yet another aspect of the invention.

In FIG. 8G, another embodiment of a self-wrapping wall 812 of the sleeve 110 of FIG. 7 is shown, wherein the same reference numerals as used above, offset by a factor of 800, are used to identify like features, wherein an enlarged fragmentary portion of the wall 812 is shown for simplicity, with it being understood that the remaining portion of the wall 812 is the same. The wall 812 is similar in construction to the wall 612; however, rather than having a single pair of non-twisted, non-heat-settable yarns extending between each twisted bundle of heat-settable and non-heat-settable yarns, two separate pairs of non-twisted, non-heat-settable yarns 824 extend between each twisted bundle 821 of heat-settable and non-heat-settable yarns 820, 824. As with the wall 512, each yarn 820, 824 undulates over one yarn and then under the next yarn, thereby forming a plain braid pattern, similar to a pattern that would be found in a plain weave, although braided, of course. It should be recognized that the number of non-heat-settable yarns 824 extending between the heat-set bundles 821 could be different than as shown, depending on the requirements of the intended application. According, more non-heat-settable yarns 824 can be included where further enhanced coverage protection and impact resistance is desired.

Figure 8H:
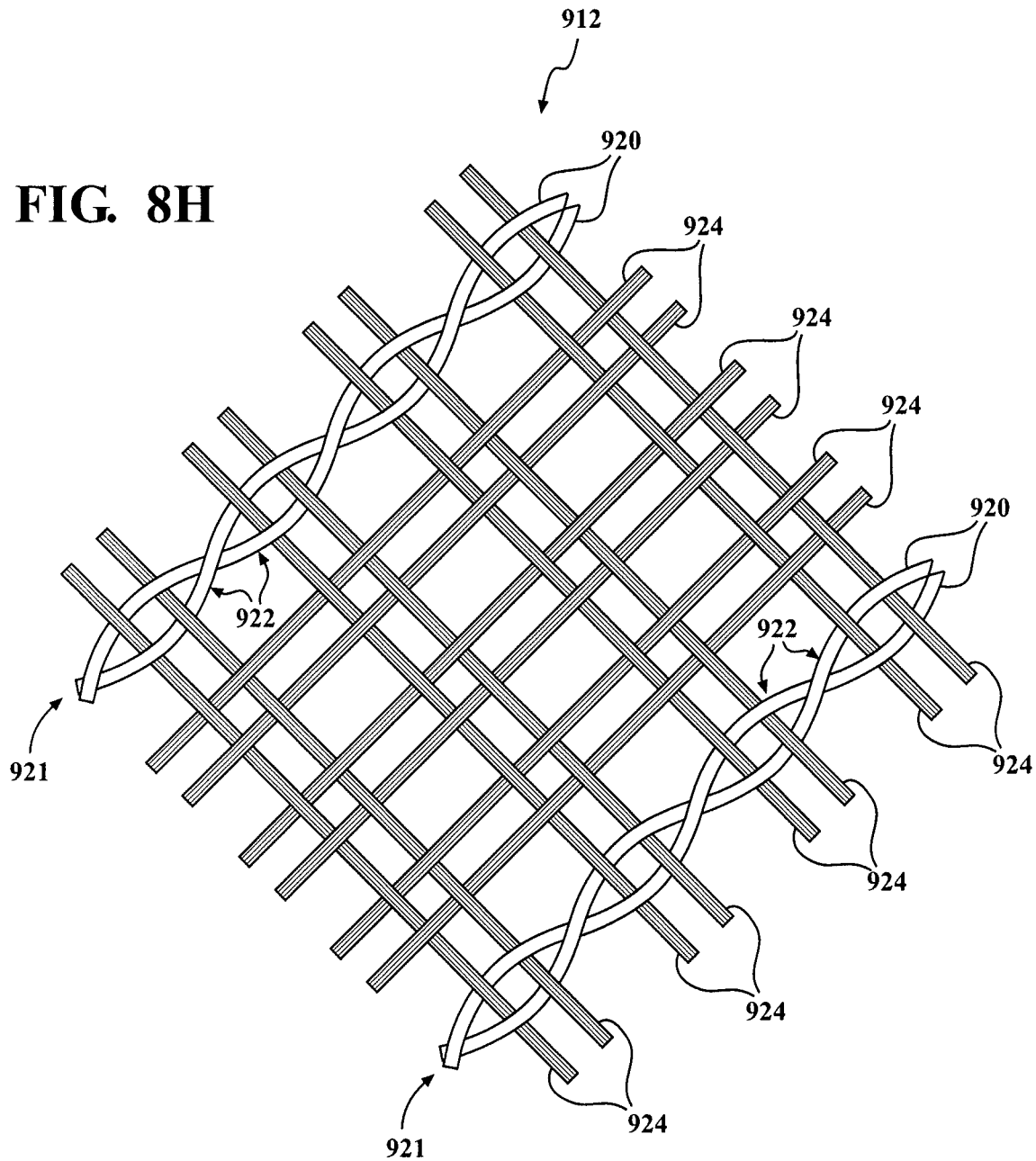
FIG. 8H is a view similar to FIG. 5 showing an enlarged fragmentary view of a wall of a self-wrapping textile sleeve constructed in accordance with yet another aspect of the invention.

In FIG. 8H, another embodiment of a self-wrapping wall 912 of the sleeve 110 of FIG. 7 is shown, wherein the same reference numerals as used above, offset by a factor of 900, are used to identify like features, wherein an enlarged fragmentary portion of the wall 912 is shown for simplicity, with it being understood that the remaining portion of the wall 912 is the same. The wall 912 includes twisted bundles 921 of heat-settable yarn 920 extending solely in one of an S or Z helical direction and non-twisted, non-heat-settable yarn 924 extending in both the S and Z helical directions. The non-heat-settable yarns 924 extending in the opposite S or Z direction to the heat-settable yarns 920 extend through loops 922 of the twisted bundles 921 in pairs, similarly as discussed above, with one non-heat-settable yarn 924 of each pair extending over-and-under one side of the loop 922 and the other non-heat-settable yarn 924 of each pair extending over-and-under and opposite side of the respective loop 922, in alternating fashion, as shown. The non-heat-settable yarns 924 extending in the same S or Z direction to the heat-settable yarns 920, thereby being parallel and co-helical therewith, extend over-and-under the heat-settable yarns 920 extending transversely to the heat-settable yarns 920, such as would be seen in a plain weave, but being braided, of course. In the embodiment shown, a total of 6 non-heat-settable yarns are shown extending between adjacent twisted bundles 921, though it is contemplated herein that the number could be more or fewer, depending on the coverage and impact resistance needs of the intended application.

Figure 8I:
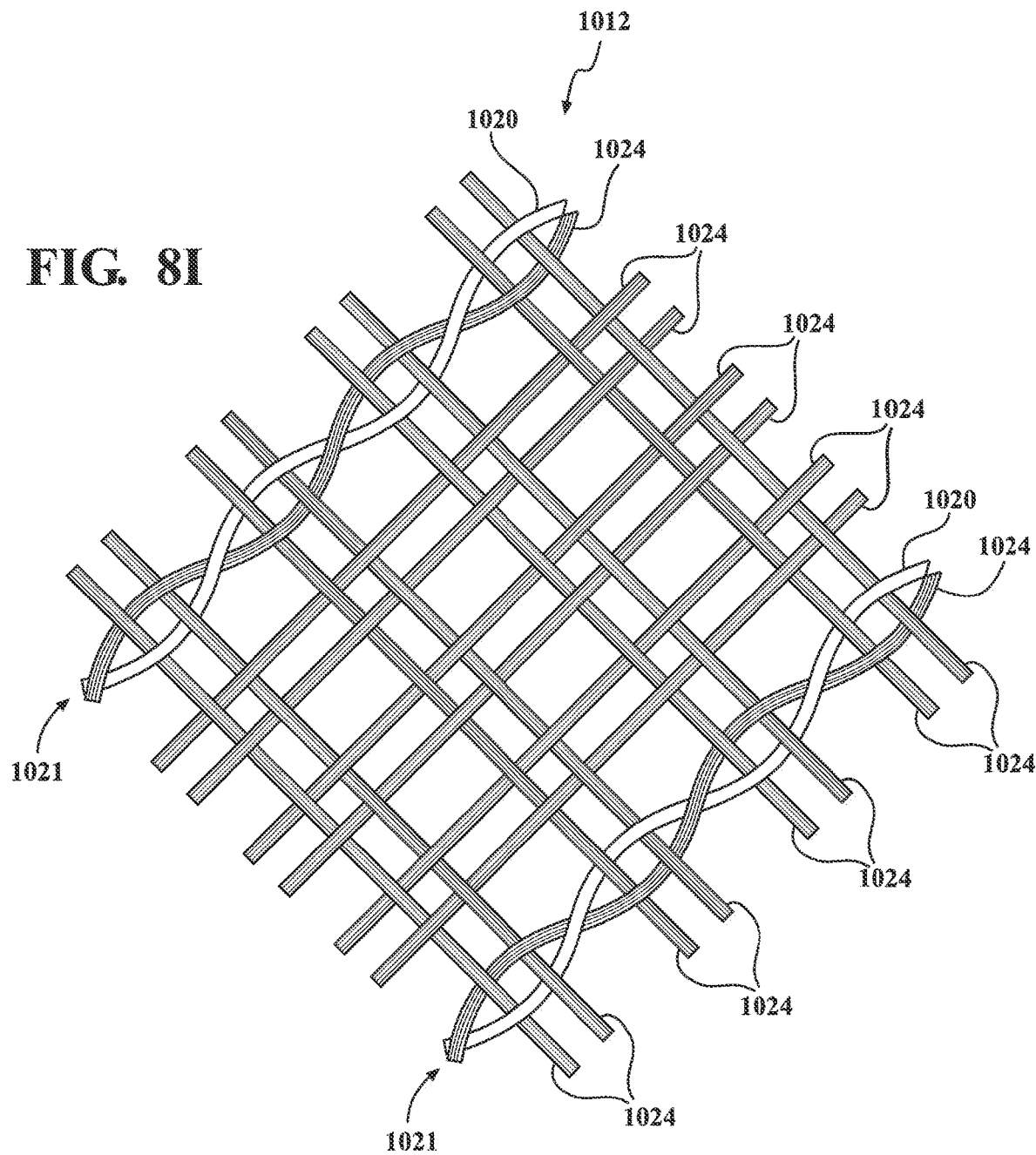
FIG. 8I is a view similar to FIG. 5 showing an enlarged fragmentary view of a wall of a self-wrapping textile sleeve constructed in accordance with yet another aspect of the invention.

In FIG. 8I, another embodiment of a self-wrapping wall 1012 of the sleeve 110 of FIG. 7 is shown, wherein the same reference numerals as used above, offset by a factor of 1000, are used to identify like features, wherein an enlarged fragmentary portion of the wall 1012 is shown for simplicity, with it being understood that the remaining portion of the wall 1012 is the same. The wall 1012 is similar to the wall 912, and includes twisted bundles 1021 extending solely in one of an S or Z helical direction and non-twisted, non-heat-settable yarn 1024 extending in both the S and Z helical directions. In contrast to the wall 912, the twisted bundles 1021 include a non-heat-settable yarn 1024 twisted with a heat-settable yarn 1020. As such, less heat-settable-yarn is included in the wall 1012 as compared to the wall 912; however, more non-heat-settable yarn 1024 is included in the wall 1012 as compared to the wall 912. As such, the wall 1012 is slightly more flexible, has a greater area of coverage protection, but has a slightly reduced ability to spring between the first and second states. Otherwise, the wall 1021 is the same as discussed above for the wall 912.

Many modifications and variations of the present invention are possible in light of the above teachings. In addition, it is to be recognized that a braided tubular self-wrapping wall constructed in accordance with the various aspects of the invention can take on a multitude of uses, including that of a protective member, a bundling member, or even a novelty item, by way of example and without limitation. It is, therefore, to be understood that the invention may be practiced otherwise than as specifically described, and that the scope of the invention is defined by any ultimately allowed claims.

What is claimed is:

1. A method of constructing a self-wrapping textile sleeve, comprising:
   braiding a plurality of yarns with one another to form a wall extending lengthwise along a central longitudinal axis between opposite ends with at least some of said yarns being provided as heat-settable yarns and non-heat-settable yarns, said wall being moveable between a decreased length, increased cross-sectional area first state and an increased length, decreased cross-sectional area second state;
   forming at least some of the yarns as bundles of yarn twisted with one another;
   forming at least some of the bundles as bundles of the heat-settable yarn and the non-heat-settable yarn twisted with one another;
   forming said wall having opposite free edges extending lengthwise between said opposite ends; and
   wrapping said opposite free edges toward one another and heat-setting said heat-settable yarns with said wall being in one of said first state and second state to form heat-set yarns that impart a bias on said wall, said bias causing said wall to self-wrap about the central longitudinal axis into a tubular configuration and causing said wall to remain in each of said first and second states absent an externally applied axial force causing said wall to be moved to the other of said first or second states.

2. The method of claim 1 further including braiding said wall with a lace-braiding machine.

3. The method of claim 1 further including braiding said wall as a seamless, circumferentially continuous wall and then cutting said wall lengthwise to form said opposite free edges.

4. The method of claim 3 further including performing the heat-setting step prior to performing the cutting.

5. The method of claim 3 further including performing the heat-setting step after performing the cutting.

6. The method of claim 1 further including braiding said wall as a substantially flat layer having said opposite free edges.

7. The method of claim 6 further including wrapping said wall about a mandrel and then performing the heat-setting.

8. The method of claim 1 further including forming at least some of the bundles entirely with heat-settable yarn.

9. The method of claim 8 further including forming at least some of the bundles entirely with non-heat-settable yarn.

10. The method of claim 1 further including forming at least some of the bundles entirely with non-heat-settable yarn.

11. The method of claim 1 further including interlinking loops of one bundle with loops of another bundle to interlock the bundles with one another.

12. The method of claim 1 further including providing the heat-settable yarn having a diameter between 0.1-0.40 mm.

13. The method of claim 1 further including braiding at least some of the yarns in non-twisted relation with one another.

14. The method of claim 13 further including providing the yarns in non-twisted relation with one another as non-heat-settable yarn.

15. The method of claim 14 further including braiding the non-twisted, non-heat-settable yarns between bundles of the heat-settable yarn and the non-heat-settable yarn.

16. The method of claim 1 further including providing at least some of the non-heat-settable yarns including at least one of wire, metal coated polymeric yarn filaments, or hybrid yarns including a conductive filament or non-conductive filament served or twisted with another.

* * * * *